(12) United States Patent
Takada et al.

(10) Patent No.: US 8,589,725 B2
(45) Date of Patent: Nov. 19, 2013

(54) DISK STORAGE APPARATUS AND METHOD FOR RECOVERING DATA

(75) Inventors: Kazuya Takada, Kodaira (JP); Kenji Yoshida, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 366 days.

(21) Appl. No.: 13/005,846

(22) Filed: Jan. 13, 2011

(65) Prior Publication Data

US 2011/0264948 A1    Oct. 27, 2011

(30) Foreign Application Priority Data

Apr. 23, 2010  (JP) .................................. 2010-100117

(51) Int. Cl.
*G06F 11/00*         (2006.01)

(52) U.S. Cl.
USPC .......................................... 714/6.24; 714/6.1

(58) Field of Classification Search
USPC ............... 714/6.24, 6.21, 6.22, 6.3, 6.1, 6.11, 714/6.12, 2
See application file for complete search history.

(56) References Cited

U.S. PATENT DOCUMENTS

| | | | | |
|---|---|---|---|---|
| 2007/0174678 | A1* | 7/2007 | King | 714/8 |
| 2009/0119443 | A1* | 5/2009 | Tremaine | 711/6 |
| 2011/0066793 | A1* | 3/2011 | Burd | 711/103 |

FOREIGN PATENT DOCUMENTS

| | | |
|---|---|---|
| JP | 05-035416 | 2/1993 |
| JP | 06-075716 | 3/1994 |
| JP | 7-141795 | 6/1995 |
| JP | 2005-108410 | 4/2005 |
| JP | 2007-149340 | 6/2007 |
| JP | 2008-077782 | 4/2008 |

OTHER PUBLICATIONS

Japanese Office Action dated May 31, 2011, filed in Japanese counterpart Application No. 2010-100117, 5 pages (with English translation).

* cited by examiner

*Primary Examiner* — Dieu-Minh Le
(74) *Attorney, Agent, or Firm* — Patterson & Sheridan, LLP

(57) ABSTRACT

According to one embodiment, a disk storage apparatus includes a write module, an operation module, and a controller. The write module is configured to write data, in units of blocks, in a designated write area of a disk. The operation module is configured to perform an exclusive OR operation on the blocks of data. The controller is configured to control the write module, causing the write module to write, in a designated block, recovery data that is a result of the exclusive OR operation on all data blocks written in the designated write area.

16 Claims, 6 Drawing Sheets

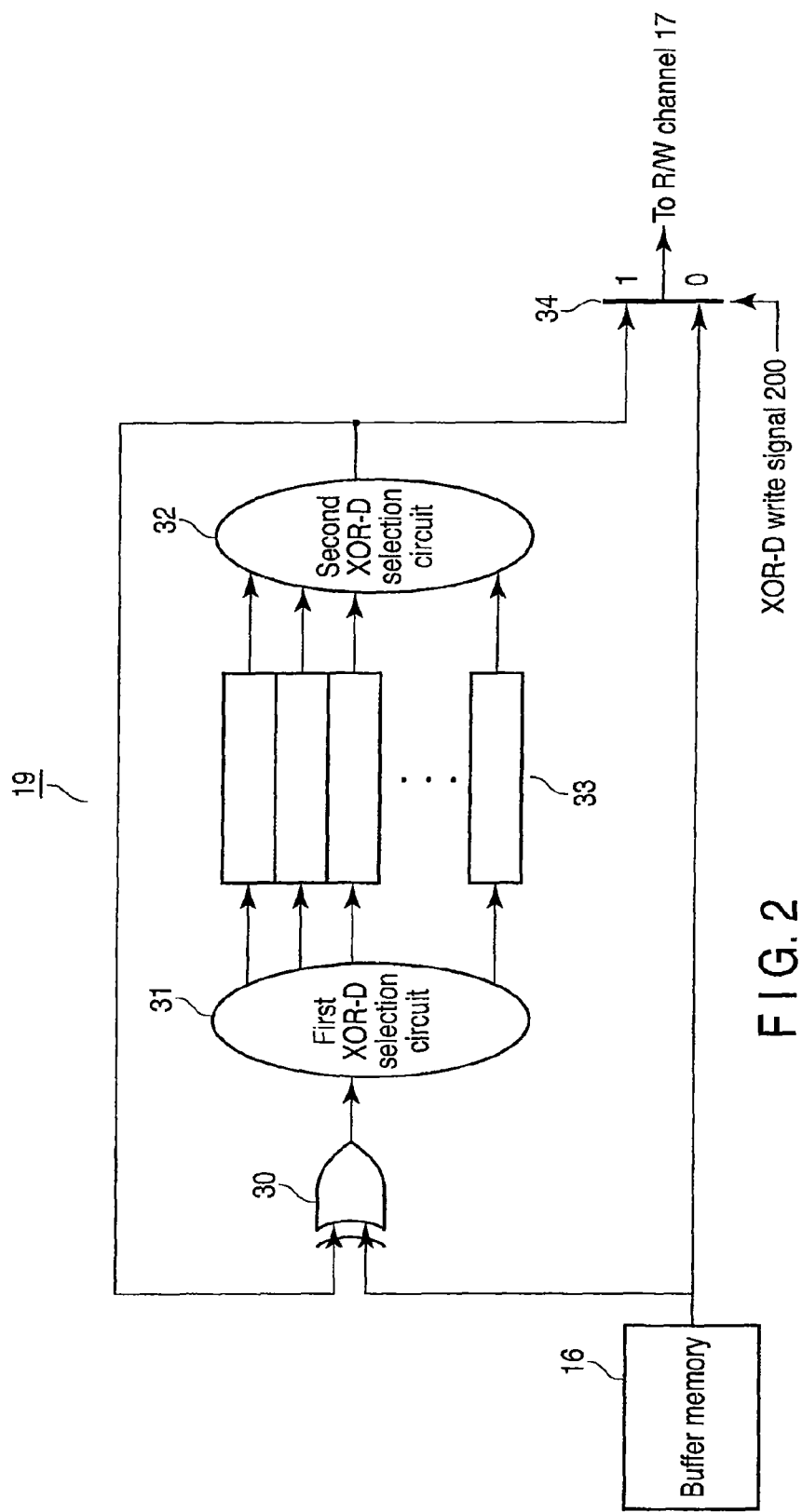
F I G. 2

DISK STORAGE APPARATUS AND METHOD FOR RECOVERING DATA

CROSS-REFERENCE TO RELATED APPLICATIONS

This application is based upon and claims the benefit of priority from Japanese Patent Application No. 2010-100117, filed Apr. 23, 2010; the entire contents of which are incorporated herein by reference.

FIELD

Embodiments described herein relate generally to a technique of recovering data in disk storage apparatuses.

BACKGROUND

In recent years, the storage capacity of the disk drives, a representative example of which is the hard disk drive, has been increased. In proportion to the storage capacity, the recording density of the disk has increased, inevitably increasing the influence of errors made in reading data from the disk.

In the conventional disk drive, the read/write operation is performed, reading and writing from and to the disk in units of sectors. In the write operation, user data (i.e., write data) and an error correction code (ECC) are written in a sector. In the read operation, the ECC data is used, performing an error correction process, if a read error is made.

In the read operation, the ECC data can be used to correct errors in the sector. The ECC data has only a limited ability of correcting errors. If any part of the data is erased in units of sectors, the erased part of the data can hardly be recovered. Therefore, not only a method of correcting errors, but also a method of effectively recovering data is now demanded.

Any method that can efficiently recover data, however, has an overhead problem. That is, the storage capacity will increase to store recovery data, and the efficiency of recoding data on the disk will decrease. Further, the recovery data should be updated when the user data and ECC data are rewritten. A long time is inevitably, needed to write a great amount of recovery data. This lowers the efficiency of the write operation. Therefore, in the disk drive, an overhead should be avoided, and data should be effectively recovered by any other process than the error correction using the ECC data.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 2 is block diagram explaining the configuration of the XOR operation module used in the embodiment;

DETAILED DESCRIPTION

Various embodiments will be described hereinafter with reference to the accompanying drawings.

In general, according to one embodiment, a disk storage apparatus includes a write module, an operation module, and a controller. The write module is configured to write data, in units of blocks, in a designated write area of a disk. The operation module is configured to perform an exclusive OR operation on the blocks of data. The controller is configured to control the write module, causing the write module to write, in a designated block, recovery data that is a result of the exclusive OR operation on all data blocks written in the designated write area.

[Configuration of the Disk Drive]

Figure 1:
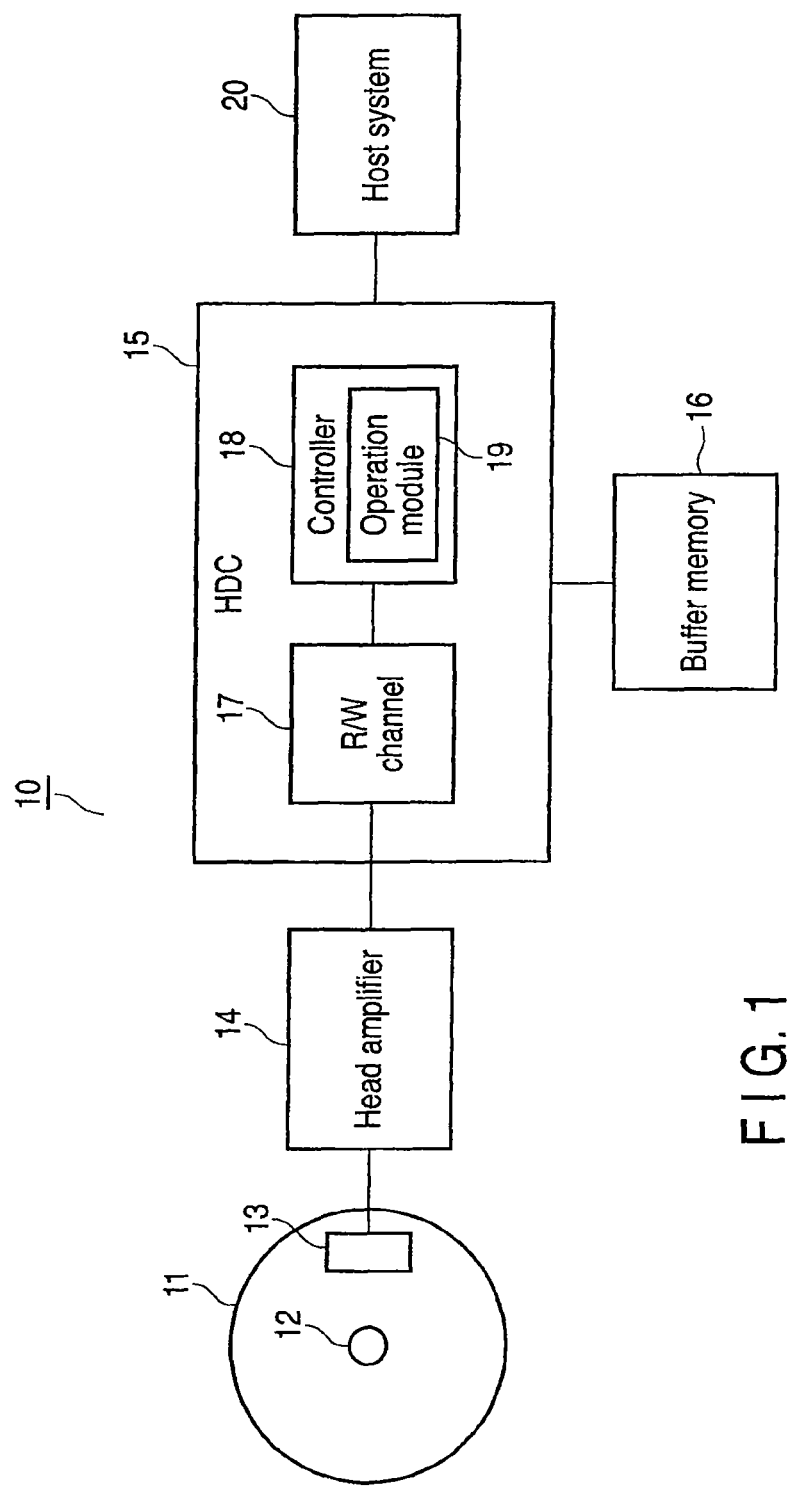
FIG. 1 is a block diagram explaining the composition of a disk drive according to an embodiment.

As shown in FIG. 1, a disk drive 10 according to an embodiment includes a disk 11, a spindle motor 12, a head 13, a head amplifier 14, a hard disk controller (HDC, or disk controller) 15, and a buffer memory 16. The disk 11 is a magnetic recording media. The spindle motor 12 rotates the disk 11. The head 13 includes a read head element and a write head element, and is configured to read and write data from and to the disk 11.

The head amplifier 14 receives a signal (read data) read by the head 13 and amplifies the signal, which is transmitted to the disk controller 15. The head amplifier 14 also receives a signal (write data) output from the disk controller 15 and converts this signal into a current, which is supplied to the head 13.

The disk controller 15 includes a read/write (R/W) channel 17 and a controller 18. The R/W channel 17 is a signal processing circuit and has a function of decoding read data the head 13 has read and encoding write data.

The controller 18 is an interface that uses the buffer memory 16, controlling the data transfer between the R/W channel 17 and a host system 20. The controller 18 controls the data recording and reproducing via the R/W channel 17, thereby recovering data in a specific way according to this embodiment. The controller 18 includes an XOR operation module 19, which is indispensable to a data recovery process as will be described later.

Controlled by the controller 18, the buffer memory 16 temporarily stores read data and write data. The host system 20 is a digital apparatus such as a personal computer or a digital TV receiver that uses the disk drive 10 as an external storage device.

As shown in FIG. 2, the XOR operation module 19 includes an XOR circuit 30, a first XOR-D selection circuit 31, a second XOR-D selection circuit 32, an XOR-D buffer memory 33, and an output switch circuit 34. The XOR circuit 30 performs exclusive OR operations (hereinafter called "XOR operation, in some cases).

The first XOR-D selection circuit 31 selects a buffer area in the buffer memory 33, in order to store the data (referred to as "XOR-D") generated by the XOR circuit 30 in the buffer memory 33. On the other hand, the second XOR-D selection circuit 32 selects a buffer area in the buffer memory 33, in order to read XOR-D from the buffer memory 33. The buffer memory 33 has a plurality of buffer areas, in which the data (XOR-D) output from the XOR circuit 30 are sequentially stored.

The output switch circuit 34 outputs the write data stored in the buffer memory 16 to the R/W channel 17 if an XOR-D write signal 200 generated in the controller 18 is invalid (having logic value 0). If the XOR-D write signal 200 is valid (having logic value 1), the output switch circuit 34 stops outputting write data selected from the buffer memory 16 by the second XOR-D selection circuit 32 and outputs recovery data (XOR-D) to the R/W channel 17.

[Data Recovery Process]

The data recovery process according to this embodiment will be explained with reference to FIGS. 3A, 3B, 3C and 3D, FIG. 4, FIG. 5 and FIG. 6.

Figure 5:
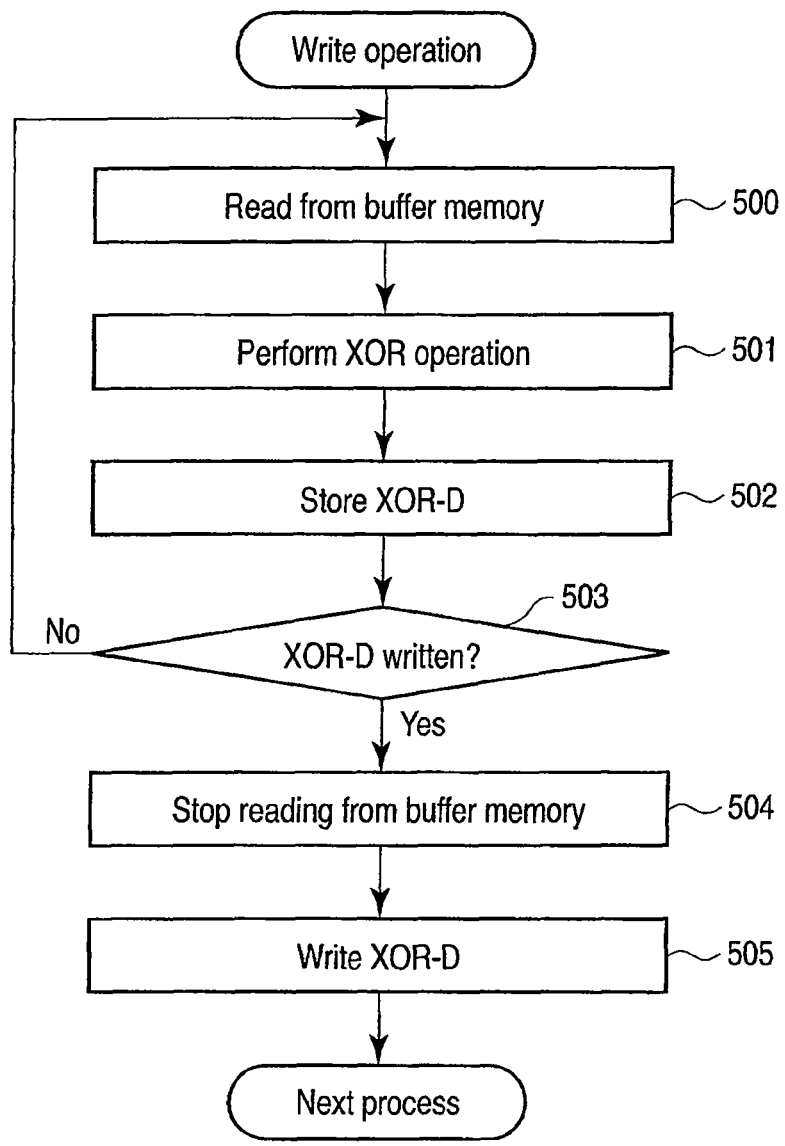
FIG. 5 is a flowchart explaining how the write operation is performed in the embodiment.

First, how the write operation is performed in this embodiment will be explained with reference to FIGS. 3A, 3B, 3C and 3D and the flowchart of FIG. 5.

In this embodiment, recovery data (XOR-D) for recovering data in units of blocks (here, in units of sectors) is written during a write operation known as a "shingled write." In the write operation, data items for a plurality of tracks are written to the disk 11 at a time.

Figure 3A:
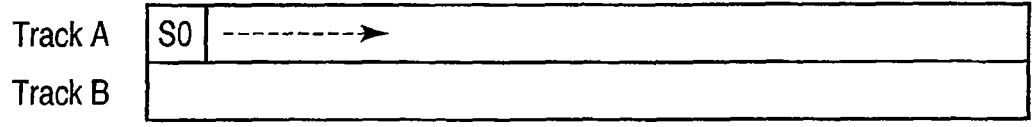
FIGS. 3A, 3B, 3C and 3D are diagrams explaining the operating principle of the data recovery method used in the embodiment.

More specifically, two data items are simultaneously written in two adjacent tracks A and B as shown in FIG. 3A. Note that the singled write is an operation of writing data from an objective track to an area of the adjacent track.

The controller 18 continuously writes data in all sectors of track A as shown in FIG. 3A, from the head sector S0 to the end sector S14. The controller 18 handles data in units of sectors (in units of blocks). This data will be called "ordinary data" in some cases, distinguished from the recovery data (XOR-D). The ordinary data includes user data and ECC data. The user data is transferred from the host system 20.

Figure 3B:
Figure 3B:
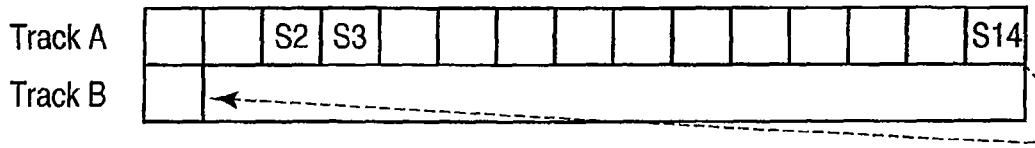
Figure 3C:
Figure 3C:

Next, the controller 18 continuously writes the ordinary data, starting at the head sector S0 of the track B adjacent to the track A as shown in FIGS. 3B and 3C. After writing the last part of the ordinary data in the penultimate sector (i.e., sector S13) of the track B, the controller 18 writes recovery data (XOR-D) in the next sector (i.e., end sector S14).

How the recovery data (XOR-D) is generated and written will be explained with reference to the flowchart of FIG. 5.

In the write operation, the controller 18 stores the user data in units of sectors, received from the host system 20, into the buffer memory 16. The controller 18 then reads the user data, in units of sectors, from the buffer memory 16 in order to write the ordinary data to the disk 11 (Block 500).

In this embodiment, the XOR operation module 19 reads the user data in units of sectors from the buffer memory 16, as shown in FIG. 2. In the XOR operation module 19, the XOR circuit 30 performs XOR operation on the user data and XOR-D selected and output from the buffer memory 33 (Block 501). The XOR operation module 19 performs the XOR operation on the data of each sector (composed of user data and XOR-D). The result of the XOR operation, i.e., XOR-D, is stored into the selected buffer area of the buffer memory 33 (Block 502).

That is, the XOR operation module 19 performs the XOR operation on all data to be written in the tracks A and B and then stores the resultant XOR-D as recovery data (XOR-D) in the designated buffer area of the buffer memory 33.

While the XOR operation module 19 is performing the XOR operation, the controller 18 receives the data items sequentially read from the buffer memory 16 and transfers them to the R/W channel 17 through the output switch circuit 34. The R/W channel 17 encodes the data items (also adds ECC data) so that the data may be recorded on the disk 11. The head 13 writes the data (including ECC data) supplied in units of sectors from the head amplifier 14, in the designated tracks A and B provided on the disk 11. In this case, the controller 18 controls the head 13, causing the same to write the data altogether in the tracks A and B.

When the head 13 finishes writing the data in the tracks A and B in ordinary way (YES in Block 503), the controller 18 validates the XOR-D write signal 200 (setting the logic value to 1) at the write timing of XOR-D. The controller 18 then stops the reading of the ordinary data from the buffer memory 16 (Block 504). The controller 18 reads the recovery data (XOR-D) from the buffer memory 33 of the XOR operation module 19. The recovery data is transferred via the output switch circuit 34 to the R/W channel 17.

Figure 3D:
Figure 3D:
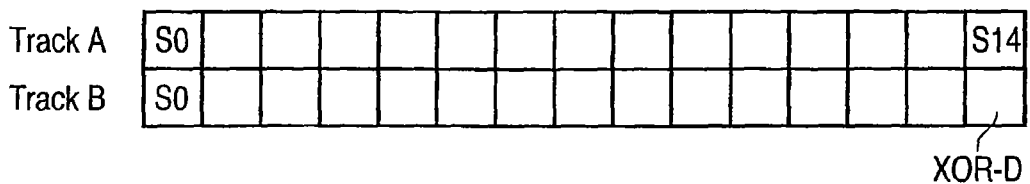

The R/W channel 17 encodes the recovery data (XOR-D) (also adding ECC data to the recovery data) so that the data may be recorded on the disk 11. The head 13 writes the recovery data (XOR-D) in the designated sector (end sector S14) of the designated track B of the disk 11 as shown in FIG. 3D (Block 505).

To write the user data read from the buffer memory 16 to the disk 11, the XOR operation module 19 automatically generates recovery data (XOR-D), and the recovery data thus generated is stored into the buffer memory 33. The recovery data (XOR-D) is continuously written to the disk 11 after the user data has been written to the disk 11.

That is, the recovery data (XOR-D) generated by the XOR operation module 19 is written in the last sector of the track B after the ordinary data has been written altogether in the tracks A and B. In this case, the recovery data (XOR-D) is identical in size (amount) to the user data recorded in a sector (i.e., one block of data), or to the data unit subjected to the ECC process of adding ECC data. If the ECC data is added to the user data of, for example, 512 bytes, the recovery data (XOR-D) will have the size of 512 bytes, too.

How data is recovered by using the recovery data (XOR-D) will be explained below, with reference to the flowchart of FIG. 6.

First, the disk drive 10 performs an ordinary read operation in response to a request coming from the host system 20, reading the data recorded in the designated sectors (i.e., sectors existing in the tracks A and B) of the disk 11. If a read error occurs during the ordinary read operation, the controller 18 performs an error correction process (ECC process) by using the ECC data recorded in the sector from which data is being read.

Figure 6:
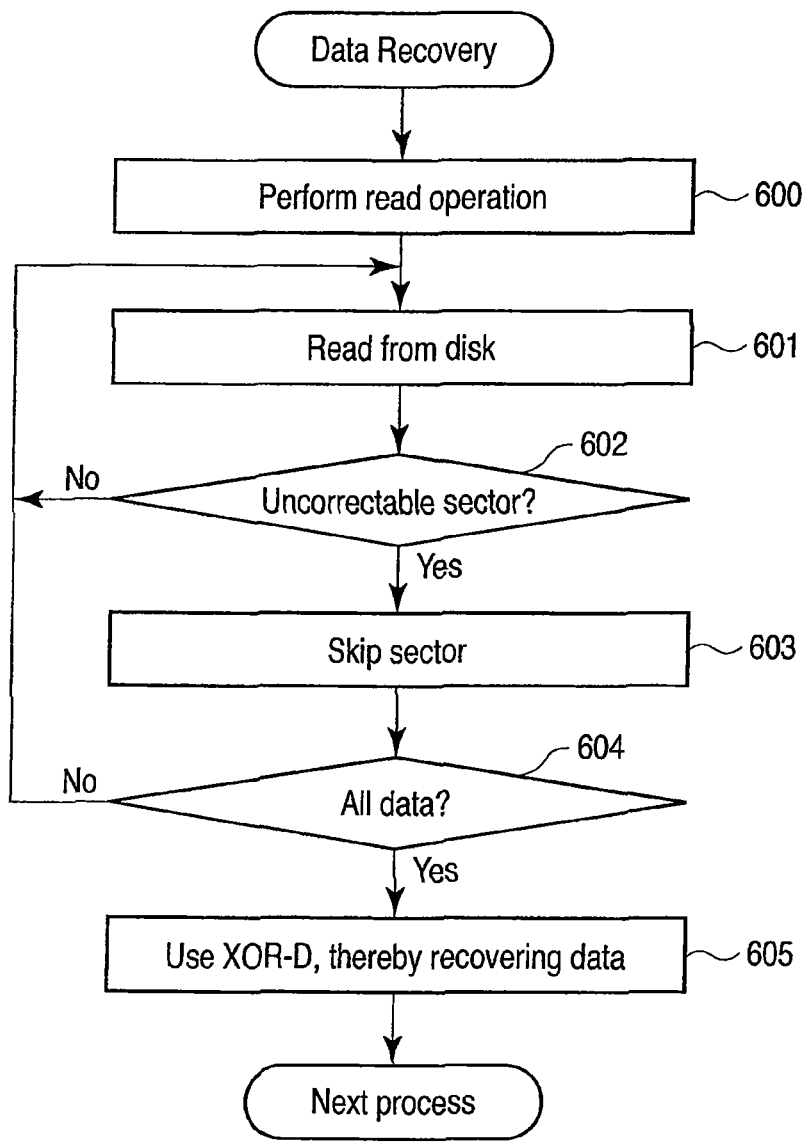
FIG. 6 is a flowchart explaining how data is recovered in the embodiment.

In this embodiment, the controller 18 performs a read operation to recover the user data in a sector as shown in FIG. 6 if the sector is found to be defective in the ECC process (Block 600). The controller 18 reads all data including the recovery data (XOR-D), from the tracks A and B provided on the disk 11 (Block 601). At this point, the controller 18 skips any sector that cannot be corrected, and reads data from all other sectors (Blocks 602, 603 and 604).

The controller 18 uses the recovery data (XOR-D) and the data recorded in all sectors, except those that cannot be corrected, thereby performing a data recovery process. The user data recorded in any defective sector can thereby be recovered (Block 605). The data recovery process will be explained below.

First, the principle of the XOR operation performed in this embodiment will be explained.

Assume that the XOR operation of "X XOR Y XOR Z" is performed on data items X, Y and Z, each being a bit train, and that this operation yields data "D." Then, XOR operation of "Y XOR Z XOR D" yields "X." Hence, the original data items X, Y and Z can be recovered if the XOR operation yields data D (XOR-D). In this instance, the data X can be recovered by using original data items Y and Z, and D (XOR-D).

The recovery data (XOR-D) is the result of the XOR operation "U0 XOR U1 XOR U2 XOR . . . Un" performed on the user data items recorded in the sectors of the tracks A and B.

In order to recover the user data item Um recorded in a sole defective sector (existing in tracks A and B, wherein data items are recorded altogether), an XOR operation is performed, i.e., "Um=U0 XOR U1 XOR U2 XOR . . . XOR Um−1 XOR Um+1 XOR . . . XOR Un XOR XOR-D." Here, it is assumed all data items Un, but Um, and the recovery data XOR-D are normal (correctable) data.

This data recovery process can recover data in units of sectors, which cannot be corrected by the ordinary ECC process. The data recovery method of this embodiment may involve an overhead, however, as will be described below.

The disk 11 needs to record not only the ECC data, but also the recovery data (XOR-D). In other words, the disk 11 must have an extra area for holding the recovery data. One block (sector) of recovery data must be provided for data items written altogether (i.e., in two tracks in this embodiment). If data items are written together in hundreds of tracks, however, the area for holding recovery data required to recover one block (one sector) of data will be negligibly small.

Extra time is required to write the recovery data (XOR-D). If data items are written together in hundreds of tracks, however, they will be written at a much lower frequency than the user data is written. The write time will be negligibly short.

Moreover, if the ordinary data recorded on the disk 11 is updated, the recovery data (XOR-D) must be updated. Since data items are written together at a time, however, they will be updated altogether even if the ordinary data is updated in part. Thus, the recovery data (XOR-D) will be also updated, too, at the same time. Hence, no overhead will occur.

Indeed an overhead may be prominent if data is written in relatively small units such as sectors. If data is written in a plurality of tracks at a time in the write operation, however, the overhead will be negligibly small. Because of these, this method of writing data is very useful.

In this embodiment, the XOR operation module 19 may perform XOR operation on a data train (including ECC data) to generate recovery data (XOR-D) if all data is composed of linear codes. If this is the case, the R/W channel 17 need not encode the recovery data (XOR-D).

In this embodiment, the XOR operation is performed in units of sectors or ECC-process units. Nonetheless, the XOR operation may be performed in any other units of data.

[Plurality of Recovery Data Items]

Figure 4:
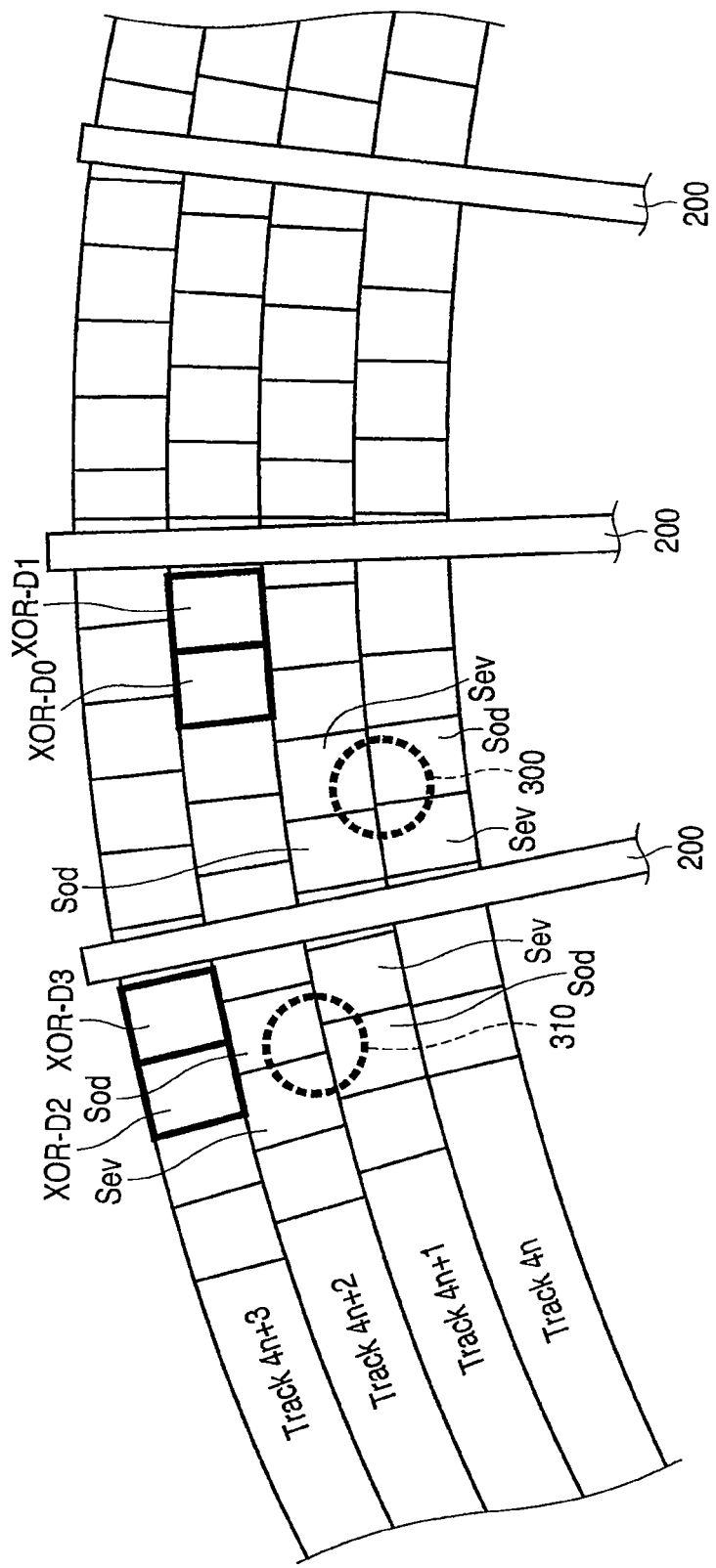
FIG. 4 is a diagram explaining how the embodiment operates to record a plurality of recovery data items.

In the embodiment described above, one block of recovery data (XOR-D) is recorded for an amount of data written at a time. With reference to FIG. 4, an embodiment will be described, in which a plurality of recovery data (XOR-D) items are written for an amount of data written at a time.

In this embodiment, four (2×2) recovery data items (XOR-D) are written for an amount of data written at a time. The recover data items shall be indicate as XOR-D0, XOR-D1, XOR-D2 and XOR-D3.

Assume that as shown in FIG. 4, data is written at a time in four tracks adjacent to one another, i.e., even-numbered track 4n, odd-numbered track 4n+1, even-numbered track 4n+2 and even-numbered 4n+3.

The controller 18 controls the XOR operation module 19, causing the XOR operation module 19 to read the user data in units of sectors from the buffer memory 16 and perform the XOR operation on the user data, generating recovery data (XOR-D). The recovery data is stored into the buffer memory 33 (see FIG. 5). The data written together (in four tracks) is divided into four recovery data items, XOR-D0, XOR-D1, XOR-D2 and XOR-D3.

The recovery data item XOR-D0 has resulted from the XOR operation performed on the data recorded in the even-numbered sectors of the even-numbered track (4n, 4n+2). The recovery data item XOR-D1 has resulted from the XOR operation performed on the data recorded in the odd-numbered sectors of the even-numbered track (4n, 4n+2). The recovery data item XOR-D2 has resulted from the XOR operation performed on the data recorded in the even-numbered sectors of the odd-numbered track (4n+1, 4n+3). The recovery data item XOR-D3 has resulted from the XOR operation performed on the data recorded in the odd-numbered sectors of the odd-numbered track (4n+1, 4n+3).

The controller 18 writes the recovery data item XOR-D0 in the last two tracks (even-number track and odd-numbered track) of a recording area for holding data items together, not in the very last track of this recording area. More specifically, the controller 18 writes recovery data items XOR-D0 and XOR-D1 in the last even-numbered track (4n+2) as shown in FIG. 4, and recovery data items XOR-D2 and XOR-D3 in the last odd-numbered track (4n+3). Thus, no recovery data is written in any other tracks defining the recording area for holding data items together.

Now that the recovery data items (XOR-D0, XOR-D1, XOR-D2 and XOR-D3), each for one group, have been written in the last even-numbered track and the last odd-numbered track, the data that cannot be corrected by the ordinary ECC process can be recovered, as four (2×2) data blocks, in adjacent two tracks. The data is recovered, basically in the sequence shown in FIG. 6.

More specifically, as shown in FIG. 4, for four (2×2) blocks 300 in the even-numbered track (4n) and the odd-numbered track (4n+1), the data in each even-numbered sector (Sev) can be recovered by using the recovery data items XOR-D0 and XOR-D2 and the data in each odd-numbered sector (Sod) can be recovered by using the recovery data items XOR-D1 and XOR-D3. Further, for four (2×2) blocks 310 in the odd-numbered track (4n+1) and the even-numbered track (4n+2), the data in each even-numbered sector (Sev) can be recovered by using the recovery data items XOR-D2 and XOR-D0, and the data in each odd-numbered sector (Sod) can be recovered by using the recovery data items XOR-D3 and XOR-D1.

Thus, in this embodiment, any one of the four (2×2) blocks (in four sectors) can be recovered by using the recovery data (XOR-D) provided for the four blocks (group). Note that the recovery data (XOR-D) can be changed in configuration, thereby to recover data recorded in more or less tracks.

The various modules of the systems described herein can be implemented as software applications, hardware and/or software modules, or components on one or more computers, such as servers. While the various modules are illustrated separately, they may share some or all of the same underlying logic or code. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage apparatus comprising:
   a write module configured to write data in a write area comprising a plurality of adjacent tracks on a disk, each track having a plurality of blocks;
   an operation module configured to perform an exclusive OR operation respectively on data to be written in each of groups of the data blocks; and a controller configured to control the write module to write recovery data for each of the groups in a designated block for the respective group, the recovery data being generated from the exclusive OR operation performed by the operation module on the data to be written in the data blocks of the respective group, wherein the controller is configured to obtain the recovery data for each of the groups from the operation module, and to control the recovery data for each of the groups to be written in the respective designated block.

2. The disk storage apparatus of claim 1, further comprising:
a data reproducing module configured to read data from the disk, thereby reproducing the data; and
a data recovery module configured to recover portions of data of the groups of blocks using the recovery data for the respective groups.

3. The disk storage apparatus of claim 1, wherein the groups comprise:
a first group that includes a first set of non-adjacent blocks of a first track;
a second group that includes a second set of non-adjacent blocks of the first track that are adjacent to the first set of non-adjacent blocks of the first track;
a third group that includes a first set of non-adjacent blocks of a second track that is adjacent to the first track; and
a fourth group that includes a second set of non-adjacent blocks of the second track that are adjacent to the first set of non-adjacent blocks of the second track.

4. The disk storage apparatus of claim 1, wherein the controller, after all data of the groups are written in the write area, controls the write module to write the recovery data for the groups in the designated blocks.

5. The disk storage apparatus of claim 1, wherein the write module is configured to write data of each group together in the write area.

6. The disk storage apparatus of claim 5, wherein the write module is configured to perform a shingled writing operation to write the data of each group together.

7. The disk storage apparatus of claim 1, wherein each of the blocks is a sector configured on the disk, and includes user data or both the user data and ECC data.

8. The disk storage apparatus of claim 1, further comprising a module configured to generate ECC data for each recovery data of the groups,
wherein the controller is configured to control the write module to write the ECC data generated for the recovery data of a group in the designated block for the group.

9. A method for recovering data, for use in a disk storage apparatus designed to write data in a write area comprising a plurality of adjacent tracks on a disk, each track having a plurality of blocks, the method comprising:
performing an exclusive OR operation respectively on data to be written in each of groups of the data blocks; and
writing, recovery data for each of the groups in a designated block for the respective group, the recovery data generated from the exclusive OR operation performed by the operation module on the data to be written in the data blocks of the respective group;
obtaining the recovery data for each of the groups from the operation module; and
controlling the recovery data for each of the groups to be written in the respective designated block.

10. The method of claim 9, further comprising:
reading data from the disk, thereby reproducing the data; and
recovering portions of data of the groups of blocks using the recovery data for the respective groups.

11. The method of claim 9, wherein the groups comprises:
a first group that includes a first set of non-adjacent blocks of a first track;
a second croup that includes a second set of non-adjacent blocks of the first track that are adjacent to the first set of non-adjacent blocks of the first track;
a third group that includes a first set of non-adjacent blocks of a second track that is adjacent to the first track; and
a fourth croup that includes a second set of non-adjacent blocks of the second track that are adjacent to the first set of non-adjacent blocks of the second track.

12. The method of claim 9, further comprising:
after all data of the groups are written in the write area, writing the recovery data for the groups in the designated blocks.

13. The method of claim 9, further comprising:
writing data of each group together in the write area.

14. The method of claim 13, further comprising:
performing a shingled writing operation to write the data of each group together.

15. The method of claim 9, wherein each of the blocks is a sector configured on the disk, and includes user data or both the user data and ECC data.

16. The method of claim 9, further comprising:
generating ECC data for each recovery data of the groups, and
controlling to write the ECC data generated for the recovery data of a group in the designated block for the group.

\* \* \* \* \*